United States Patent
Shaw

(10) Patent No.: US 8,515,029 B2
(45) Date of Patent: Aug. 20, 2013

(54) SYSTEM AND METHOD FOR VISUAL VOICE MAIL IN AN LTE ENVIRONMENT

(75) Inventor: Venson M. Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/287,324

(22) Filed: Nov. 2, 2011

(65) Prior Publication Data

US 2013/0108032 A1     May 2, 2013

(51) Int. Cl.
*H04M 1/64* (2006.01)

(52) U.S. Cl.
USPC ............... 379/88.14; 379/93.24; 379/210.02; 455/414.4; 715/752

(58) Field of Classification Search
USPC ................... 379/88.13, 88.14, 142.07, 93.24, 379/100.08, 100.13, 142.14, 210.02, 900; 455/414.4, 432.2; 715/752
See application file for complete search history.

(56) References Cited

U.S. PATENT DOCUMENTS

| | | |
|---|---|---|
| 5,459,717 A | 10/1995 | Mullan et al. |
| 5,608,786 A | 3/1997 | Gordon |
| 5,630,060 A | 5/1997 | Tang et al. |
| 5,740,231 A | 4/1998 | Cohn et al. |
| 5,742,763 A | 4/1998 | Jones |
| 5,742,905 A | 4/1998 | Pepe et al. |
| 5,764,899 A | 6/1998 | Eggleston et al. |
| 5,802,510 A | 9/1998 | Jones |
| 5,809,128 A | 9/1998 | McMullin |
| 5,870,454 A | 2/1999 | Dahlen |
| 5,943,648 A | 8/1999 | Tel |
| 5,970,122 A | 10/1999 | LaPorta et al. |
| 5,974,449 A | 10/1999 | Chang et al. |
| 5,987,100 A | 11/1999 | Fortman et al. |
| 6,014,429 A | 1/2000 | LaPorta et al. |
| 6,085,101 A | 7/2000 | Jain et al. |
| 6,188,683 B1 | 2/2001 | Lang et al. |
| 6,212,550 B1 | 4/2001 | Segur |
| 6,215,858 B1 | 4/2001 | Bartholomew et al. |
| 6,360,256 B1 | 3/2002 | Lim |
| 6,389,114 B1 | 5/2002 | Dowens et al. |
| 6,438,217 B1 | 8/2002 | Huna |
| 6,449,646 B1 | 9/2002 | Sikora et al. |
| 6,493,685 B1 | 12/2002 | Ensel et al. |
| 6,636,587 B1 | 10/2003 | Nagai et al. |
| 6,671,061 B1 | 12/2003 | Joffe et al. |
| 7,085,357 B2 | 8/2006 | Gavette et al. |
| 7,483,525 B2 * | 1/2009 | Chaddha et al. ......... 379/142.07 |
| 7,649,983 B2 * | 1/2010 | O'Neal ..................... 379/88.13 |

(Continued)

OTHER PUBLICATIONS

U.S. Appl. No. 13/277,589, filed Oct. 20, 2011, Shaw.

(Continued)

*Primary Examiner* — Md S Elahee
(74) *Attorney, Agent, or Firm* — Woodcock Washburn LLP

(57) ABSTRACT

A method for delivery of a voice mail message to a recipient. The method includes identifying the recipient of the voice mail message, receiving a notification indicative of one of the subscriber's availability, the subscriber's presence and the subscriber's location, recording the voice mail message, selectively converting the voice mail message to a text message based on the notification, and delivering either the text message or the voice mail message to a device of the recipient based on the notification. The method may further include receiving an alternative destination device for delivery of the text message or the voice message and delivering the text message or the voice message to the alternative destination device using internet protocol.

17 Claims, 14 Drawing Sheets

(56) References Cited

U.S. PATENT DOCUMENTS

| | | |
|---|---|---|
| 7,664,249 B2 | 2/2010 | Horvitz et al. |
| 7,746,987 B1 | 6/2010 | Becker et al. |
| 8,077,838 B2 | 12/2011 | Patel et al. |
| 8,081,745 B2 | 12/2011 | Burrell et al. |
| 8,161,116 B2 | 4/2012 | Chaddha et al. |
| 8,224,296 B2 | 7/2012 | Shaw |
| 8,265,602 B2 | 9/2012 | Shaw |
| 8,280,451 B1 | 10/2012 | Zheng et al. |
| 8,351,905 B1 | 1/2013 | Shaw |
| 8,355,703 B2 | 1/2013 | Shaw |
| 8,358,752 B2 | 1/2013 | Shaw et al. |
| 8,385,513 B2 | 2/2013 | Howell et al. |
| 2001/0005837 A1 | 6/2001 | Kojo |
| 2002/0001371 A1 | 1/2002 | Goldberg et al. |
| 2003/0018720 A1 | 1/2003 | Chang et al. |
| 2004/0082314 A1 | 4/2004 | Shaw et al. |
| 2004/0127200 A1 | 7/2004 | Shaw et al. |
| 2005/0010679 A1 | 1/2005 | Yamaga et al. |
| 2005/0083915 A1 | 4/2005 | Mathew et al. |
| 2005/0114462 A1 | 5/2005 | Mathew et al. |
| 2005/0172033 A1 | 8/2005 | Mathew et al. |
| 2005/0255867 A1 | 11/2005 | Nicodem |
| 2010/0057872 A1 | 3/2010 | Koons et al. |
| 2011/0098021 A1 | 4/2011 | Shaw et al. |
| 2011/0098022 A1 | 4/2011 | Shaw et al. |
| 2011/0116610 A1 | 5/2011 | Shaw et al. |
| 2011/0117887 A1 | 5/2011 | Shaw et al. |
| 2011/0143716 A1 | 6/2011 | Shaw |
| 2011/0143722 A1 | 6/2011 | Shaw et al. |
| 2011/0143723 A1 | 6/2011 | Shaw et al. |
| 2011/0143725 A1 | 6/2011 | Shaw |
| 2011/0177796 A1 | 7/2011 | Jacobstein et al. |
| 2011/0244834 A1 | 10/2011 | Martens et al. |
| 2011/0300832 A1 | 12/2011 | Shaw |
| 2011/0300833 A1 | 12/2011 | Shaw |
| 2011/0305327 A1 | 12/2011 | Shaw |
| 2012/0029917 A1 | 2/2012 | Chang et al. |
| 2012/0114108 A1 | 5/2012 | Katis et al. |
| 2012/0121077 A1 | 5/2012 | Gabay et al. |
| 2012/0202535 A1 | 8/2012 | Chaddha et al. |
| 2012/0322415 A1 | 12/2012 | Shaw |
| 2013/0023287 A1 | 1/2013 | Shaw et al. |
| 2013/0094637 A1 | 4/2013 | Shaw |
| 2013/0101096 A1 | 4/2013 | Shaw |
| 2013/0101097 A1 | 4/2013 | Shaw |
| 2013/0122871 A1 | 5/2013 | Shaw |

OTHER PUBLICATIONS

U.S. Appl. No. 13/274,944, filed Oct. 17, 2011, Shaw.
U.S. Appl. No. 13/297,731, filed Nov. 16, 2011, Shaw.
U.S. Appl. No. 13/277,744, filed Oct. 20, 2011, Shaw.

* cited by examiner

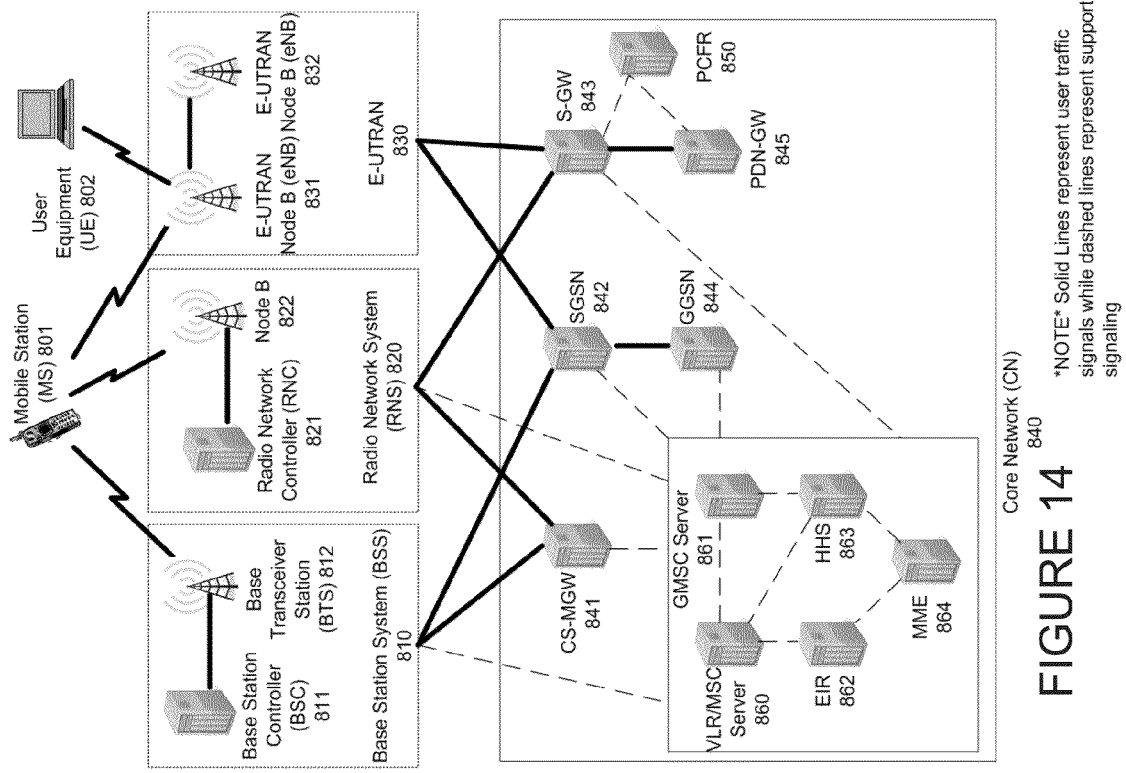

SYSTEM AND METHOD FOR VISUAL VOICE MAIL IN AN LTE ENVIRONMENT

CROSS-REFERENCE TO RELATED APPLICATIONS

This application is related by subject matter to co-pending U.S. patent application Ser. No. 13/277,589, filed Oct. 20, 2011, U.S. patent application Ser. No. 13/274,944, filed Oct. 17, 2011, U.S. patent application Ser. No. 13/297,731, filed Nov. 16, 2011, and U.S. patent application Ser. No. 13/277,744, filed Oct. 20, 2011. The entirety of each application is hereby incorporated by reference herein.

TECHNICAL FIELD

Embodiments of the disclosure are directed to voice mail systems in telecommunications, and more particularly, to a system and method for implementing visual voice mail.

BACKGROUND

A calling party that does not connect with a called party will often be invited to leave a voice mail message for the called party. More recent developments enable the delivery of visual voice mail to the called party. Such access is typically provided on a person-to-person or peer-to-peer basis, meaning that a single calling party may leave a single voice mail message to a single called party.

In established wireless telecommunications networks, mobile devices connect to a voice mail box using circuit switched networks. For example, a calling party will initiate a circuit switched connection to a called party. Upon receiving a notification (i.e., a no answer) from the called party, the calling party will establish a circuit switched connection to the voicemail box of the called party. From there, the voicemail message may be stored on a visual voicemail (VVM) server which has access to a visual voicemail to text transcription (VMTT) server. The VMTT server may then deliver the text version of the voicemail to the called party via SMS or email. This methodology consumes valuable resources of the network provider.

SUMMARY

The following presents a simplified summary that describes some aspects or embodiments of the subject disclosure. This summary is not an extensive overview of the disclosure. Indeed, additional or alternative embodiments of the subject disclosure may be available beyond those described in the summary.

An example embodiment of the disclosure may be directed to a method for delivery of a voice mail message to a recipient including identifying the recipient of the voice mail message, receiving a notification indicative of one of the subscriber's availability, the subscriber's presence and the subscriber's location, and recording the voice mail message, selectively converting the voice mail message to a text message based on the notification, and delivering either the text message or the voice mail message to a device of the recipient based on the notification. The text message or voice message may be delivered to a device of the recipient using a packet switched network. The method may further include receiving an alternative destination device for delivery of the text message or the voice message and delivering the text message or the voice message to the alternative destination device using internet protocol. The alternative destination device may be an appliance connected to the internet. The method may further include receiving a distribution list and delivering the text message or voice message to multiple recipients based on the distribution list and may also include one recipient receiving the text message and another recipient receiving the voice message.

An example embodiment of the disclosure may also be directed to a method for processing a voice mail message to a recipient including receiving a text message at a voice mail server representative of the voice mail message to be delivered, converting the text message to the voice mail message, and sending the voice mail message to a device of the recipient via a packet switched network. The voice mail message may be sent via a circuit switched network if the packet switched network is unavailable. The method may further include receiving a distribution list wherein the voice mail message is delivered to multiple recipients based on the distribution list.

Another example embodiment of the disclosure may also be directed to a method of delivering a voice mail message to a recipient including receiving a map indicating a destination of interest, receiving a voice mail message associated with the map, and delivering the voice mail message along with the map indicating the destination of interest to the recipient. The voice mail message may be selectively transcribed to a text message based on one of availability of the recipient, presence of the recipient, location of the recipient, and selection of an alternative destination device of the recipient.

An example embodiment of the disclosure may also be directed to a voice mail server having at least one processor, wherein the processor is configured to receive a voice mail message from a calling party to a recipient, selectively transcribe the voice mail message to a text message based on one of availability of the recipient, the presence of the recipient, location of the recipient and a selected destination receiving device of the recipient, and deliver either the voice mail message or a text message to the recipient based on the transcribe function. The processor may be further configured to receive a distribution list for the voice mail message and to deliver the voice mail message to multiple recipients in the distribution list. The processor may be further configured to receive a map indicating a location of interest and to deliver the voice mail message with the map indicating the location of interest.

Another example embodiment of the disclosure may also be directed to a visual voice mail server having at least one processor wherein at least one processor is configured to receive a voice mail message and a distribution list having multiple recipients, transcribe the voice mail message to a text message, deliver the voice mail message to at least one recipient and the text message to at least one other recipient. At least one processor may be further configured to select delivery of the voice mail message or the text message based on one of availability of each of the subscribers, presence of each of the subscribers; location of each of the subscribers and a selection of an alternative destination device of each of the subscribers. At least one processor may be further configured to receive a map indicating a destination of interest and forwarding the map to each of the recipients along with the voice message and the text message.

BRIEF DESCRIPTION OF THE DRAWINGS

The following description is better understood when read in conjunction with the appended drawings.

FIG. 14 illustrates a PLMN block diagram view of an example architecture in which visual voice mail systems may be incorporated.

DETAILED DESCRIPTION OF ILLUSTRATIVE EMBODIMENTS

The present disclosure will now be described with respect to the appended drawings. In the description that follows, the "recipient" or "subscriber" are used interchangeably and should be interpreted as the called party for whom the visual voice mail is intended.

Figure 1:
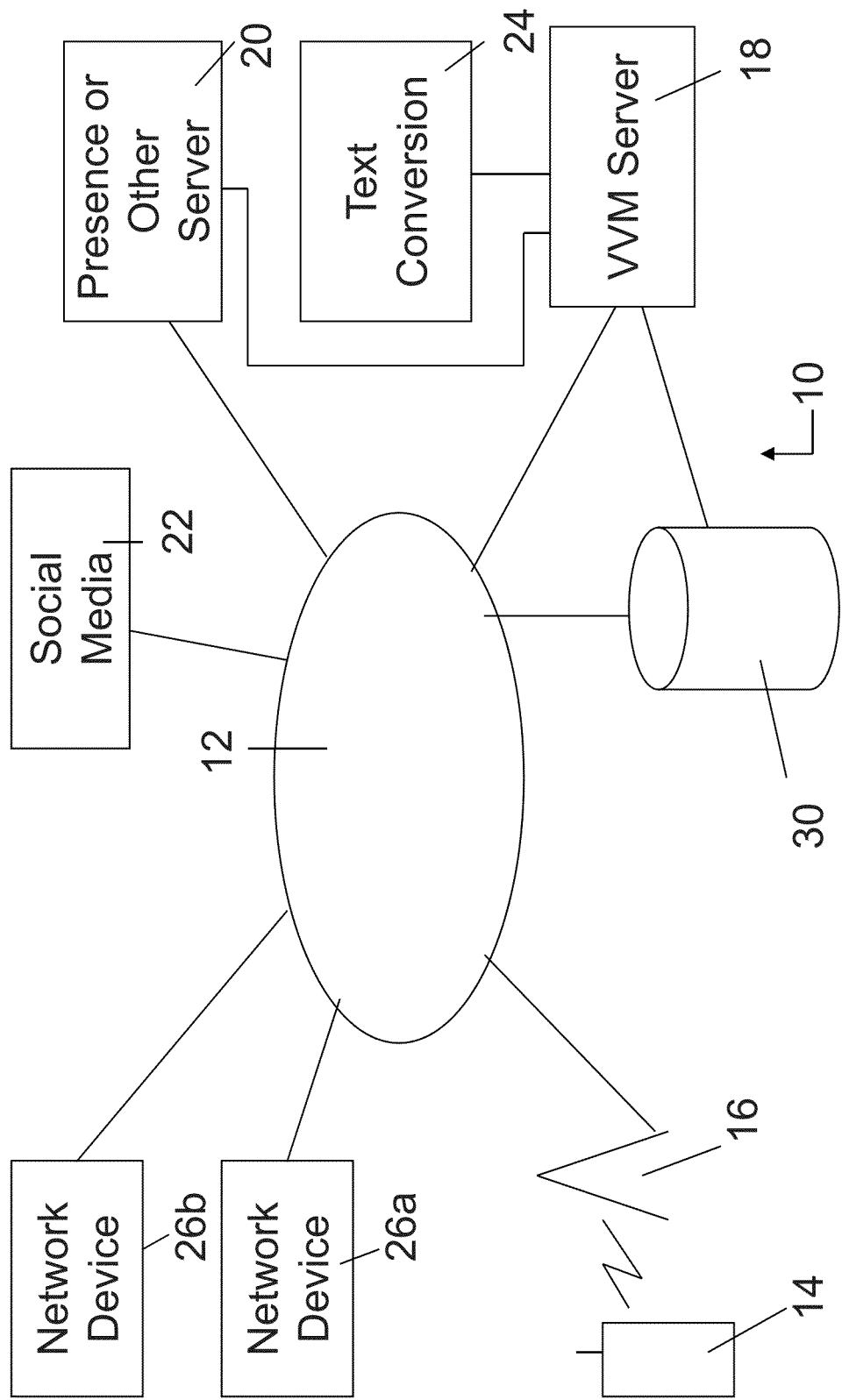
FIG. 1 is an example high level network diagram of an embodiment of the disclosure.

With reference to FIG. 1, there is shown the system 10 which may be constructed in an example embodiment of the present disclosure. There is a network 12 which in an illustrative embodiment, is the Internet, perhaps using IP protocols. However, in other example embodiments, the network 12 can additionally or alternatively include another internet, a private network, a public network, and the like, or any other combination thereof. There is also shown a wireless communication device 14 in wireless communication with a cellular antenna 16 which, through a communications network may interface with network 12. FIGS. 11, 12, 13 and 14 are examples of such communication networks. The wireless network may be a Long Term Evolution (LTE) network, also known as 4G, or any type of cellular network, including but not limited to, those based upon Global System for Mobile Communications (GSM), Code Division Multiple Access (CDMA), Wideband Code Division Multiple Access CDMA (WCDMA), 3rd Generation Partnership Project (3GPP), Enhanced Data Rates for GSM Evolution (EDGE), 4G, or any other type of cellular network, and may also be any other type of wireless network, including Wi-Fi, Worldwide Interoperability for Microwave Access (WiMAX), wireless local area network (WLAN), another IEEE 802.XX network, or any other type of wireless network capable of transmitting data. Attached to or in communication with the network 12 are one or more network devices 26a, 26b such as workstations or other computing devices, it being understood by those skilled in the art that such network devices may also include netbook computers, laptop computers, tablet computers, personal digital assistants (PDA's), internet-enabled mobile telephones, smart phones, and any other network device capable or sending or receiving data to and from the Internet. Also attached to or in communication with the network 12 is a visual voice mail (VVM) server 18 which may be in communication with other servers 20, including a presence server. The presence or other servers 20 may also be in communication with the network 12 and may, for example, include location servers, presence servers, advertising servers, or any other type of server provided either by wireless network operators or by third parties. The VVM server 18 may also be in communication with a text conversion server 24 which is capable of converting visual voice mail from text to speech and speech to text. It will be appreciate that in some example embodiments, the VVM 18 may be in direct communication with the presence or other server 20 and/or the text conversion server 24. Furthermore, in some example embodiments, two or more of the VVM 118 server, the presence or other server 20, and/or the text conversion server 24 may be implemented as part of the same server or server system comprising one or more computers. In other embodiments, the VVM 18 may communicate with the presence or other server 20 and/or the text conversion server 24 via a network such as the network 12, a private network, and/or a public network.

Still referring to FIG. 1, there is also a database 30 which is accessible via the network 12 by a user of a mobile device 14 or the VVM server 18 or any of the other servers 20 which are authorized to access the database 30. The database 30 may, for example, include provisioning information, subscription information, preference information or other network control or user information relating to the user of the mobile device 14. The database 30 may be standalone or be part of other databases that service the network, including home location registers (HLRs) or visitor location registers (VLRs). Also shown connected to the network 12 in FIG. 1 is a social media function 22, which may, for example, include access to Facebook®, Twitter®, Linked-In®, or other social media functionality. The social media function 22 may be implemented as part of a server or a server system comprising at least one computer. The social media function 22 may also be implemented as part of a server or server system supporting other functionality, including but not limited to, the VMM server 18, the presence or other server 20, and/or the text conversion server 24, according to an example embodiment of the disclosure.

The wireless device 14 is representative of any appropriate type of device that can communicate on a wireless network. Example devices include any type of wireless receiver or transceiver device (e.g., cell phone, smart phone, pager, PDA, PC, specialized broadcast receiving device, satellite radio receiver, satellite phone, and television). Example devices can comprise any appropriate mobile device, such as, for example, a portable device, a variety of computing devices including (a) a portable media player, e.g., a portable music player, such as an MP3 player, an iPod touch, a Walkman, etc., (b) a portable computing device, such as a laptop, a personal digital assistant ("PDA"), a portable phone, such as a cell phone or the like, a smart phone (e.g., iPhone, Blackberry, Android-based phone, etc.), a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof. For example purposes only, the mobile device 14 will be referred to as smart phone 14, though clearly not limited to such.

In accordance with an embodiment of the disclosure, a voicemail message may be implemented on a packet switched network using a broadcast capability of the presence server 20. For example, with reference to FIG. 2, a presence server 36 (e.g., an example of a presence server 20) is configured to determine the presence of a called party 35 and determines the status of the called party 35 as unavailable 37. The presence server 36 may broadcast or otherwise transmit the status of the called party 35 to the calling party through the network 12 which may be a packet switched network so that calling party device 34 knows that the called party 35 is unavailable. Knowing that status, the calling party 34 may interface directly with a visual voicemail to text transcription (VMTT) server 38 (e.g., an example of a VVM server 18) to leave a voice message that is converted to text to be sent as a data message to the called party device 42 via a packet switched network. In this manner, resources of the network that otherwise would be required to deliver a voice to text transcription of a voicemail message are conserved. Alternative embodiments may include recording a voice mail message to be deposited directly into the calling party's mailbox 40 based on the negative availability of the called party, in which case the message will not undergo voice to text transcription at VMTT server 38. The disclosure may also include multiple called parties or recipients.

In accordance with the multiple embodiments described herein, there may be the creation of a distribution list that facilitates the distribution of text messages or voice messages being sent to multiple recipients based on the distribution list. The distribution list may include contact information as well as attributes such as profile information, demographic information, group information, or any other type of classification which may be used to construct or filter the distribution list.

Figure 2:
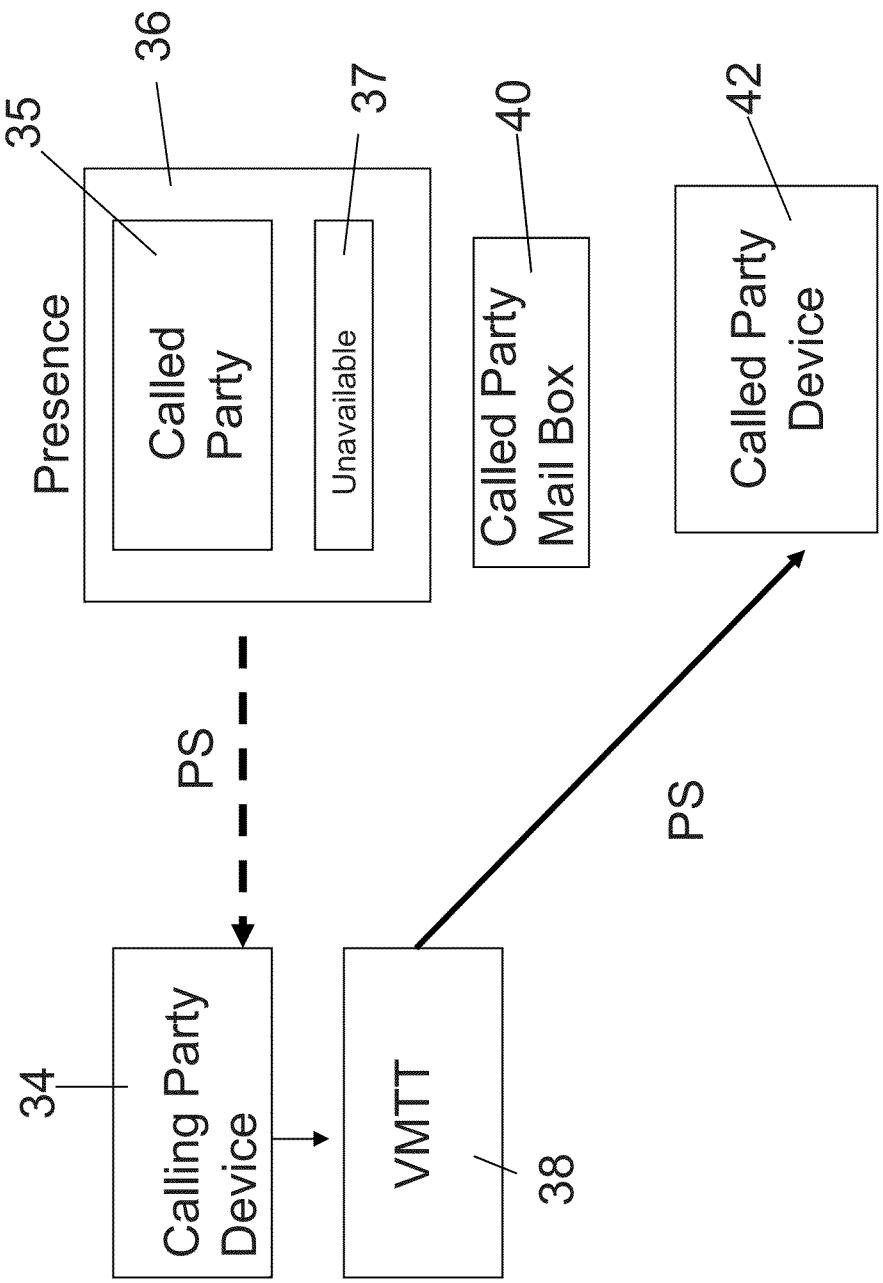
FIG. 2 is an example architecture diagram in accordance with an embodiment.
Figure 3:
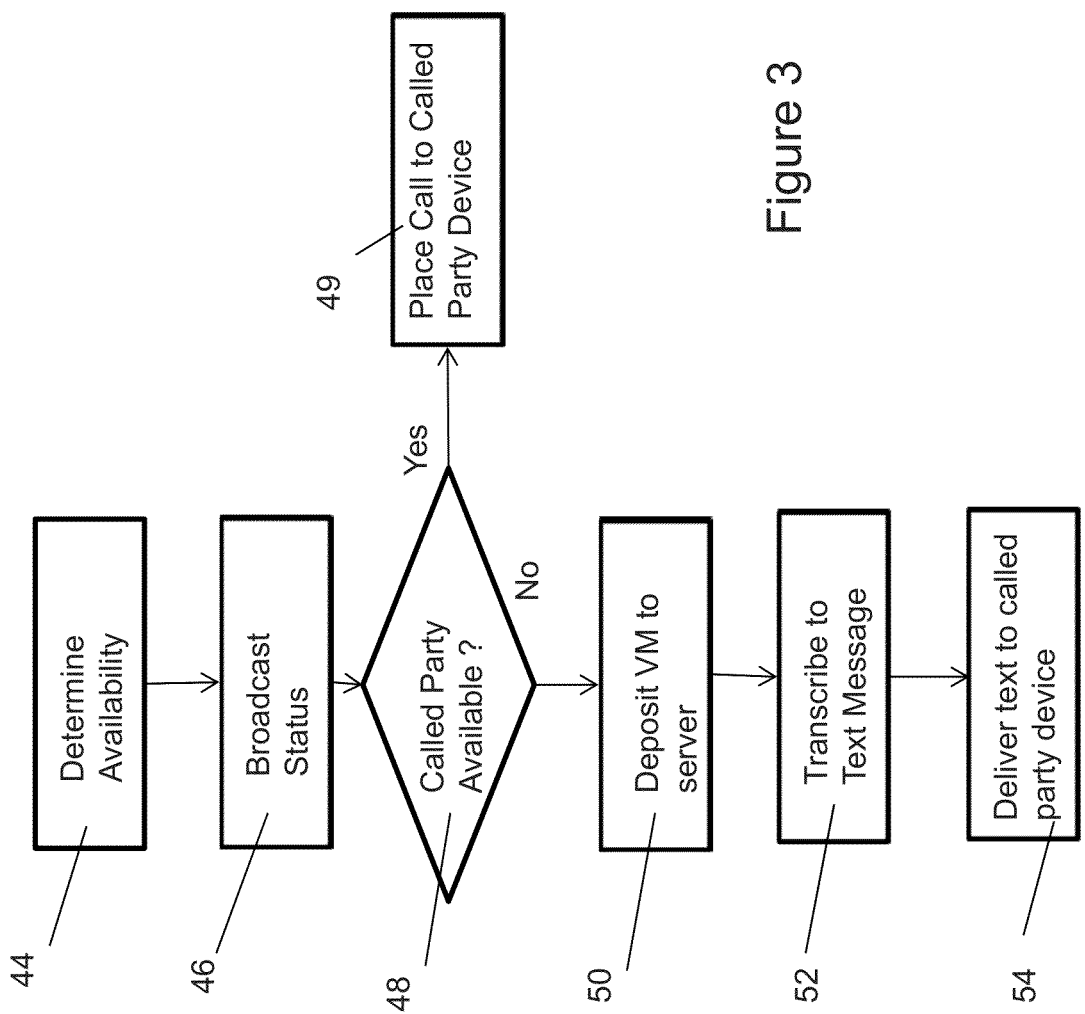
FIG. 3 is an example method in accordance with an embodiment of the disclosure.

With reference to FIG. 3, a method of the present disclosure is described in conjunction with the example architecture diagram of FIG. 2. At 44, the presence server 36 determines the availability of the called party 35. At 46, the presence server 36 determines the the called party's 35 status and transmits that status. At 48, the decision as to whether the called party is available is received. If the called party is available, the call is placed to the called party device 42 at 49. If the called party 35 is unavailable, then the calling party 34 receives the broadcast indicating that the called party 35 is unavailable and at 50 deposits a voicemail message into the called party's VMTT 38. At 52 the VMTT device 34 initiates a transcribing from voicemail to text. At 54, the VMTT initiates delivery of the text message via a packet switched network.

Figure 4:
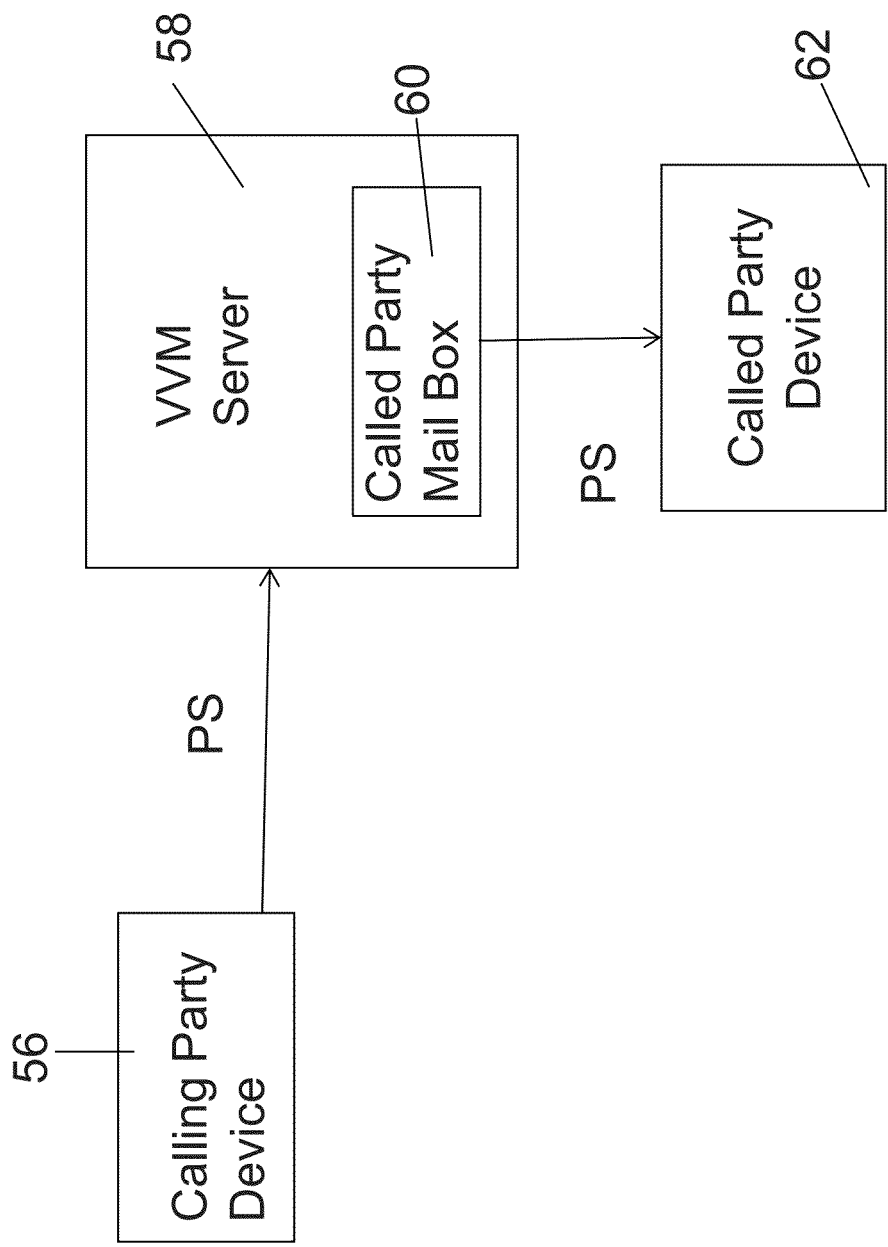
FIG. 4 is an example architecture in accordance with an alternative embodiment of the disclosure.

In accordance with another embodiment and with reference to FIG. 4, the calling party device 56 may send a text message from the calling party device 34 to the visual voicemail server 58 to be deposited into the called party's mail box 60. The visual voice mail server 58 may then convert the text message to a voice message using text to speech conversion functionality. The voice message may then be sent to the called party's device 62 using the packet switched network. Alternatively, the voice message may be sent using the circuit switched network if the packet switched network is unavailable. The message may be sent with a priority set by the server, set by the calling party, or set by the called party. The message may be pushed to the called party device 62 or requested by the called party device 62.

In accordance with another embodiment, pre-recorded visual voice mail messages, including multi-media attachments, may be used by enterprise subscribers to reach out to their customers. The pre-recorded messages may, for example, be general in nature, or may include specific sales information, public service announcements, emergency announcements or any other type of content. The pre-recorded message may include target-marketing type content so that messages are customized based on demographics, age, preferences, and the like. In an LTE environment or other packet-switched environment, such pre-recorded visual voice mail messages may be broadcast to multiple destination mail boxes.

Figure 5:
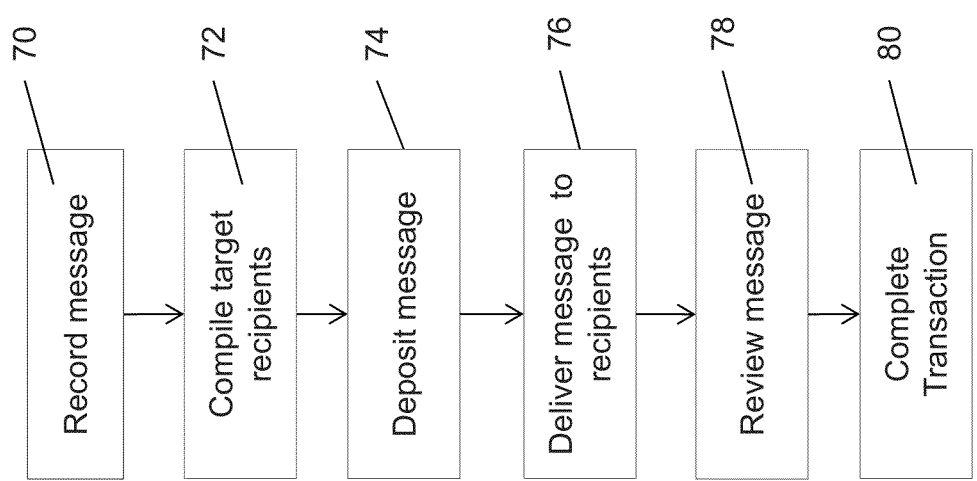
FIG. 5 is an example process in which a merchant may use LTE to deliver visual voice mail messages to a plurality of recipients.

With reference to FIG. 5, there is shown an example process for pushing voice mail messages to multiple recipients. At 70, the visual voice mail message is pre-recorded. The message may be, for example, a business or enterprise recording a product promotion. At 72, the enterprise compiles a list of targeted recipients, which may be based on demographics such as age, location, gender, preferences and profiles of potential targeted recipients. The targeted recipients are then identified by a customer group profile or a contact Mobile Subscriber/Station Integrated Services Digital Network (MSISDN) or other identification mechanism. At 74, the message is deposited into the message storage server. At 76, the visual voice mail server delivers the message to the mobile devices of the targeted recipients. At 78, the method may continue with the subscriber reviewing the message and, if applicable, at 80 wherein the commercial transaction between the enterprise and one or more recipients is completed.

Figure 6:
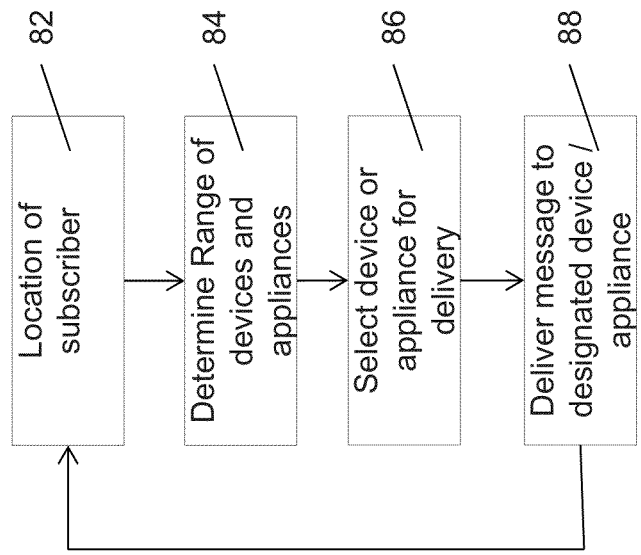
FIG. 6 is an example process in which a visual voice mail message may be delivered to a device or appliance on a wired network.

In accordance with another embodiment, the visual voice mail messages may be delivered in accordance with wire line broadband technologies. For example, some of the wire line access network technologies available to the home and office include without limitation devices and appliances such as a fax machine, refrigerator, microwave, and other appliances connected via broadband. Additionally devices may include without limitation, laptops, tablets, set top boxes or any other type of device. For the purposes of this disclosure, appliances and devices are used interchangeably to mean the collection of any such devices or appliances. An example embodiment is shown in FIG. 6. A subscriber may register devices and appliances as delivery destinations as part of a voice mail profile. Each of the devices and appliances may have a network name and network address, as well as an IP address associated therewith. For example, a home network may be identified by a particular IP address, and then each of the devices or appliances on that home network identified by a network name and/or address. At 82, subscriber's current location is identified using the subscriber's mobile handset. The location may be by known techniques, including latitude-longitude mapping, GPS, or other such location determining techniques. At 84, the wire line access network technologies available to the subscriber either at the subscriber's home, office or other location are identified which may, for example, be based on data previously entered in a subscriber's voice mail profile and which coincide with the subscriber's location. At 86, the device or appliance for delivery is selected. This selection process may be controlled by the handset and may, for example, be determined by communication between the mobile handset and the device through an RFID process, near field communications, selection from a handset application, or otherwise. At 88, the visual voice mail message is delivered. The process repeats at 82 any time the subscriber changes location. In this manner, the subscriber may have messages delivered to devices or appliances in the home as selected based on the particular location in the home, then have messages delivered to different devices or appliances at the subscriber's office based on whether the subscriber is in the cafeteria, office or conference room. It is also possible that the subscriber may designate a remote delivery appliance or device as well. For example, if the location determination results in a subscriber on her way to the office, the messages may be delivered to a device or appliance at the office.

Figure 7:
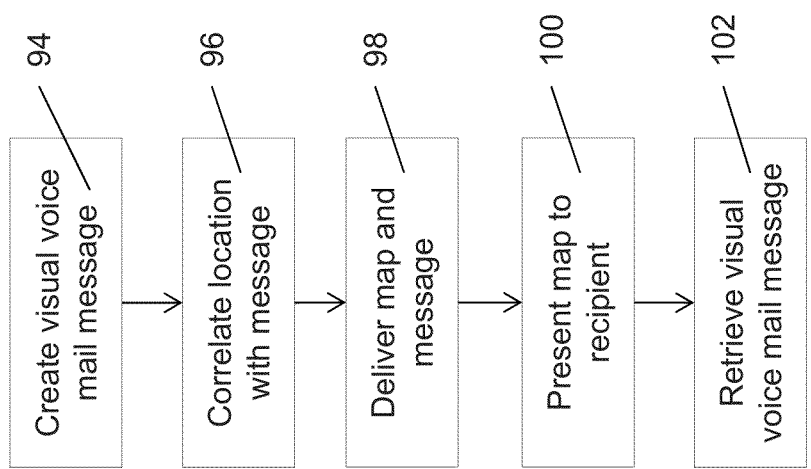
FIG. 7 is an example process in which a visual voice mail message may be delivered with a mapped location for retrieval by a recipient.

In accordance with another embodiment and with reference to FIG. 7, there is shown an example process for delivery of a hybrid message which includes a voice mail message and a location. The location may refer to the location of the calling party, the location of the called party, or a location of interest to the message. The method also includes the ability for the subscriber receiving the hybrid message to click on the location of the map to listen to the specific message associated with that location, for example, a meeting location, a point of reference, or the like. At 94, the sender creates a new visual voice mail message through the visual voice mail server. At 96, the sender correlates a geographic location with the message through the visual voice mail server. At 98, the map and the message are delivered to the subscriber. At 100, the subscriber may be presented with a map to browse and select a location associated with a particular voice mail message. At 102, the subscriber retrieves the voice mail either by text message or voice by selecting a location on the map.

Figure 8:
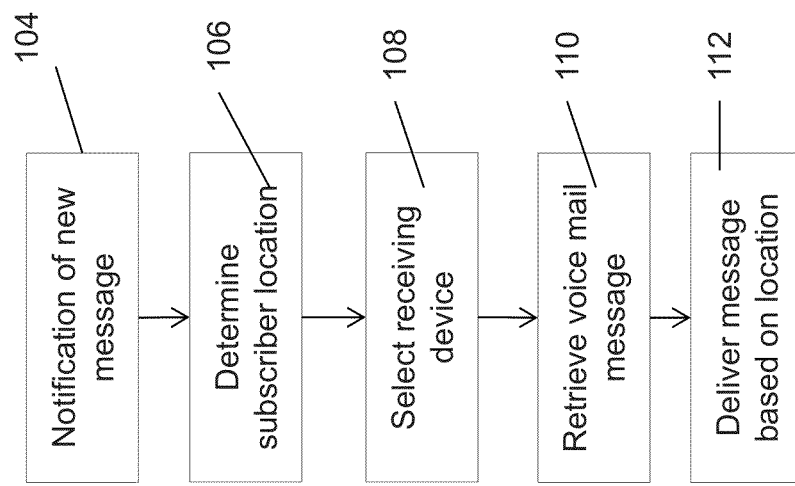
FIG. 8 is an example process in which a visual voice mail delivery method may be based on a location of the recipient.

In accordance with another embodiment, the visual voice mail delivery method, for example, by audio file and/or text transcription, may be selected based on the subscriber locations. For example, it may be desirable to send a message via text delivery if the subscriber is in an office environment or via voice if the subscriber is in a home environment. With respect to FIG. 8, there is shown an example process. At 104, the wireless network receives a notification that there is a new voice message is stored at the mail box of the subscriber. At 106, the network identifies the current location of the subscriber based on known technologies, which, may, for example, be global positioning system (GPS), cell ID, assisted GPS (AGPS), time difference of arrival (TDOA), or other such technologies. At 108, the device to receive the message is selected. The selection may be based on a variety of factors, including but not limited to home, office, the availability of other devices or appliances, or any other factors or criteria selected by the user and offered by the network. At 110, the network retrieves the voice message from the subscriber mailbox. At 112, the network delivers the voice message, either in audio, text or a combination thereof, based on the location. Alternatively, the selection of delivery method may be based on the presence or availability of the subscriber.

With respect to the various examples set forth above, it will be understood that each may be a standalone embodiment or that one or more examples may be combined into alternative embodiments. For example, the example of delivery of voice mail to appliances may be combined with the selection of text or voice based on the location of the subscriber to deliver text to a television set or the voice version of the message to a range, refrigerator or other kitchen appliance. None of the examples set forth herein are intending to limit the disclosure in any way.

Figure 9:
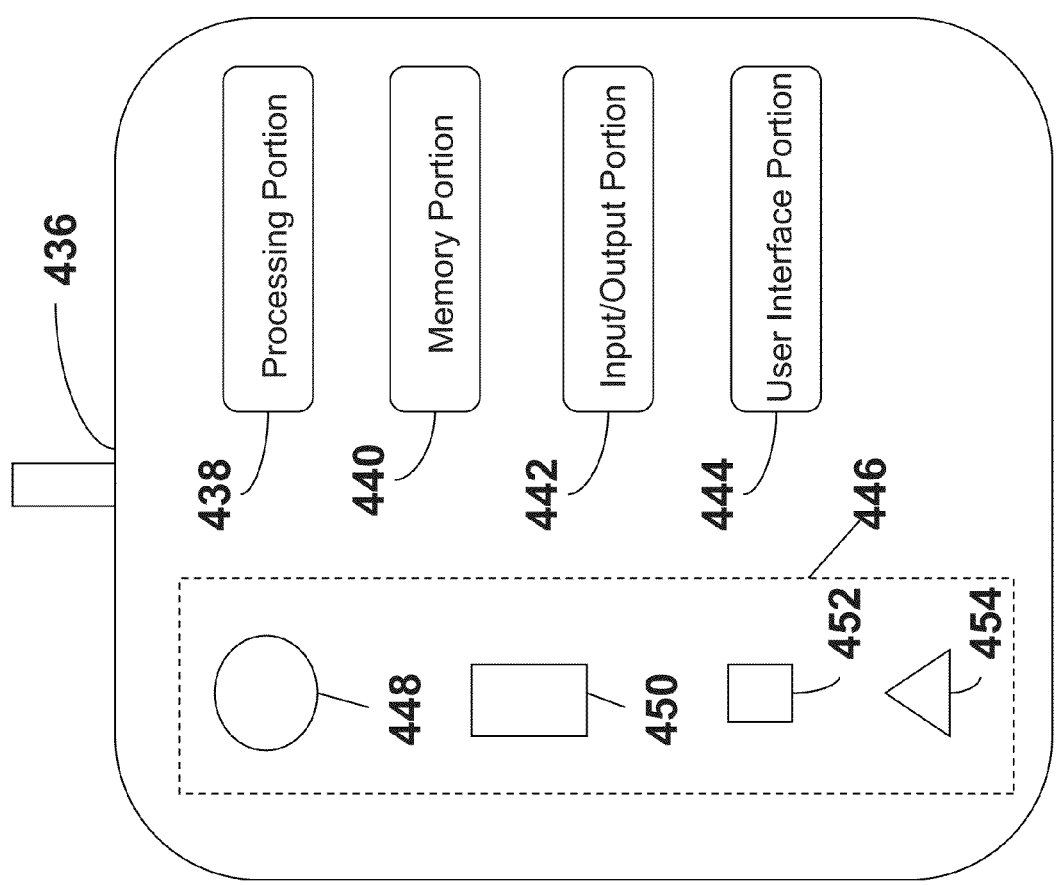
FIG. 9 is a block diagram of an example device that is configurable to be compatible with visual voice mail systems.

FIG. 9 is a block diagram of an example device 436 that may, for example be a smartphone or other mobile device and which is configurable to receive visual voice mail displays. The example device 436 may be an example implementation for the device 14 of FIG. 1, according to an example embodiment. The device 436 can include any appropriate device, mechanism, software, and/or hardware for distributing connectivity and/or transmission time as described herein. As described herein, the device 436 comprises hardware, or a combination of hardware and software. And, each portion of the device 436 comprises hardware, or a combination of hardware and software. In an example configuration, the device 436 can comprise a processing portion 438, a memory portion 440, an input/output portion 442, a user interface (UI) portion 444, and a sensor portion 446 comprising at least one of a video camera portion 448, a force/wave sensor 450, a microphone 452, a moisture sensor 454, or a combination thereof. The force/wave sensor comprises at least one of a motion detector, an accelerometer, an acoustic sensor, a tilt sensor, a pressure sensor, a temperature sensor, or the like. The motion detector is configured to detect motion occurring outside of the communications device, for example via disturbance of a standing wave, via electromagnetic and/or acoustic energy, or the like. The accelerator is capable of sensing acceleration, motion, and/or movement of the communications device. The acoustic sensor is capable of sensing acoustic energy, such as a noise, voice, etc., for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 54 is capable of detecting moisture, such as detecting if the device 436 is submerged in a liquid. The processing portion 438, memory portion 440, input/output portion 442, user interface (UI) portion 444, video camera portion 448, force/wave sensor 450, and microphone 452 are coupled together to allow communications therebetween (coupling not shown in FIG. 9).

In various embodiments, the input/output portion 442 comprises a receiver of the device 36, a transmitter of the device 436, or a combination thereof. The input/output portion 442 is capable of receiving and/or providing information pertaining to visual voice mail messages as described herein or other communications with other devices and device types. For example, the input/output portion 442 can include a wireless communications (e.g., 2.5G/3G/4G) SIM card. The input/output portion 442 is capable of receiving and/or sending text information, video information, audio information, control information, image information, data, an indication to initiate a connection, an indication to initiate a transmission, start time information, end time information, interval time information, interval length information, random number value information, connect time information, transmit time information, parsing information, authentication information, or any combination thereof. In an example configuration, the input\output portion 442 comprises a GPS receiver. In an example configuration, the device 36 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 442 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 438 is capable of processing visual voice mail as described herein. The processing portion 438, in conjunction with any other portion of the device 436, enables the device 436 to covert speech to text or convert text to speech. The processing portion 358 can include one or more processors configured to execute computer-readable instructions, perhaps accessible via the memory portion 436 or another memory location, in order to provide or perform one or more functions in accordance with one or more example methods described herein.

In a basic configuration, the device 436 can include at least one memory portion 440. The memory portion 440 can store any information utilized in conjunction with visual voice mail as described herein. Depending upon the exact configuration and type of processor, the memory portion 40 can be volatile (such as some types of RAM), non-volatile (such as ROM, flash memory, etc.). The device 436 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 440, or a portion of the memory portion 440 is hardened such that information stored therein can be recovered if the device 436 is exposed to extreme heat, extreme vibration, extreme moisture, corrosive chemicals or gas, or the like. In an example configuration, the information stored in the hardened portion of the memory portion 440 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 440 intelligible.

The device 436 also can contain a UI portion 444 allowing a user to communicate with the device 436. The UI portion 444 is capable of rendering any information utilized in conjunction the visual voice mail as described herein. For example, the UI portion 444 can provide means for entering text (including numbers), entering a phone number, rendering text, rendering images, rendering multimedia, rendering sound, rendering video, receiving sound, or the like, as described herein. The UI portion 444 can provide the ability to control the device 436, via, for example, buttons, soft keys, voice actuated controls, a touch screen, movement of the device 436, visual cues (e.g., moving a hand in front of a camera on the mobile device 436), or the like. The UI portion 444 can provide visual information (e.g., via a display), audio information (e.g., via speaker), mechanically (e.g., via a vibrating mechanism), or a combination thereof. In various configurations, the UI portion 444 can comprise a display, a touch screen, a keyboard, a speaker, or any combination thereof. The UI portion 444 can comprise means for inputting biometric information, such as, for example, fingerprint information, retinal information, voice information, and/or facial characteristic information. The UI portion 444 can be utilized to enter an indication of the designated destination (e.g., the phone number, IP address, or the like).

In an example embodiment, the sensor portion 446 of the device 436 comprises the video camera portion 448, the force/wave sensor 450, and the microphone 452. The video camera portion 448 comprises a camera (or cameras) and associated equipment capable of capturing still images and/or video and to provide the captured still images and/or video to other portions of the device 436. In an example embodiment, the force/wave sensor 450 comprises an accelerometer, a tilt sensor, an acoustic sensor capable of sensing acoustic energy, an optical sensor (e.g., infrared), or any combination thereof.

Figure 10:
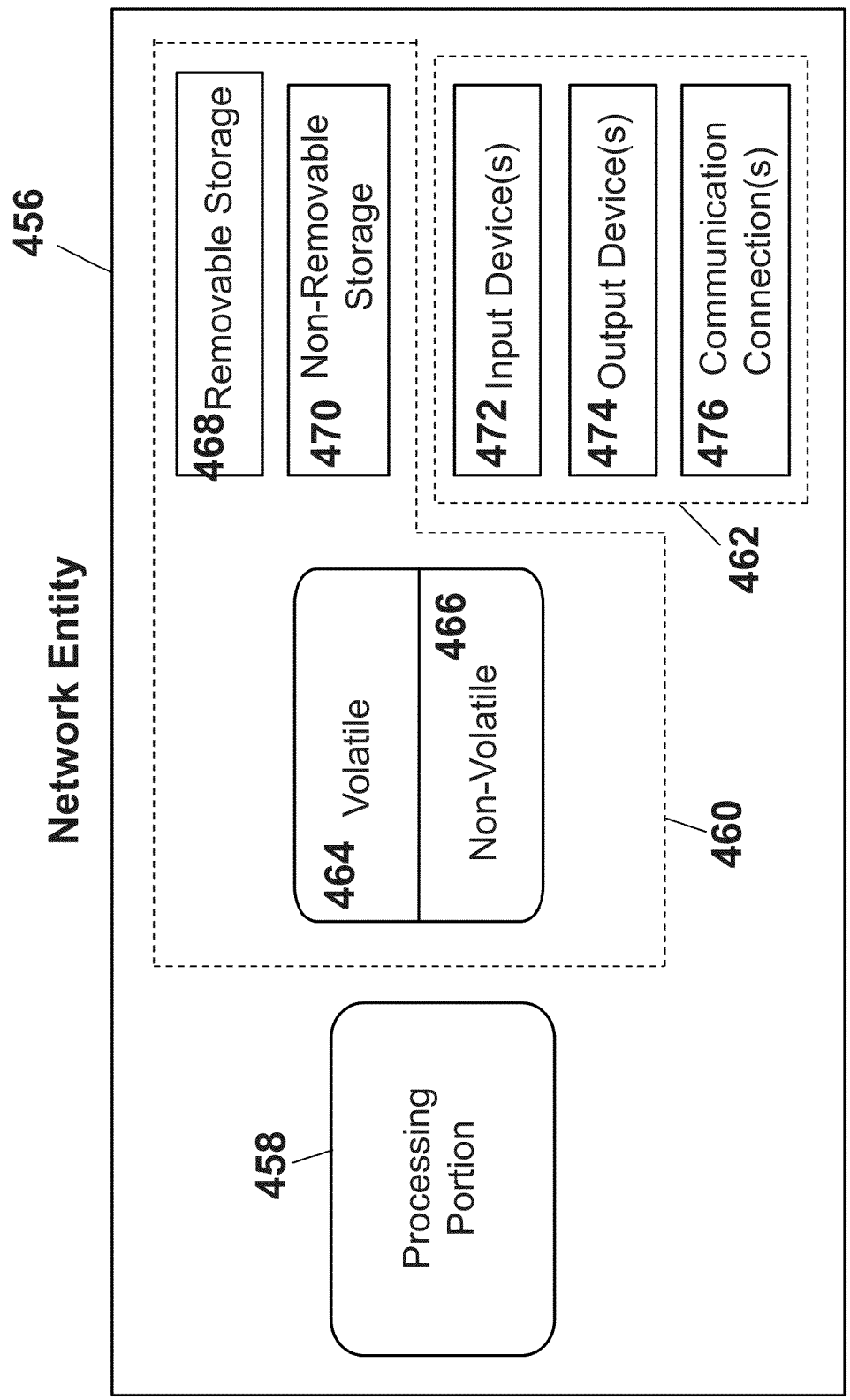
FIG. 10 is a block diagram of an example network entity configurable to be compatible with visual voice mail systems.

FIG. 10 is a block diagram of an example network entity 456 such as a personal computer or a television configurable to facilitate the multi-screen environment of a visual voice mail system as described herein. In an example embodiment, the network entity 456 comprises a network entity comprising hardware, or a combination of hardware and software. And, each portion of the network entity 456 comprises hardware, or a combination of hardware and software. When used in conjunction with a network, the functionality needed to facilitate visual voice mail processing may reside in any one or combination of network entities. The network entity 456 depicted in FIG. 4 represents any appropriate network entity, apparatus, or combination of network entities or apparatuses, such as a processor, a server, a gateway, etc., or any combination thereof. It is emphasized that the block diagram depicted in FIG. 4 is example and not intended to imply a specific implementation or configuration. Thus, the network entity 456 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example configuration, the network entity 456 comprises a processing portion 458, a memory portion 460, and an input/output portion 462. The processing portion 458, memory portion 460, and input/output portion 462 are coupled together (coupling not shown in FIG. 4) to allow communications therebetween. The input/output portion 462 is capable of receiving and/or providing information from/to a device (e.g. device 436) and/or other network entity configured to be utilized in conjunction with visual voice mail services. For example, the input/output portion 462 is capable of, in conjunction with any other portion of the network entity 456 as needed, receiving and/or sending text information, video information, audio information, control information, image information, data, or any information relating to visual voice mail, or any combination thereof.

The processing portion 458 is capable of performing functions associated with distributing connectivity and/or transmission time, as described herein. For example, the processing portion 458 is capable of, in conjunction with any other portion of the network entity 456 as needed, executing an application for processing visual voice mail via the user interface portion 444, processing text messages received via the input/output portion 442, processing voice messages received via the input/output portion 442, or the like, or any combination thereof. The processing portion 458 can include one or more processors configured to execute computer-readable instructions, perhaps accessible via the memory portion 460 or another memory location, in order to provide or perform one or more functions in accordance with one or more example methods described herein.

The memory portion 460 can store any information utilized in conjunction with distributing connectivity and/or transmission time, as described herein. For example, the memory portion 460 is capable of storing information pertaining to a start time, an end time, an interval time, a random number value, a connect time, a transmission time, parsing information, authenticating information, hashing information, encrypting information, a location of a device, a predetermined text/voice message, a text/voice message, a predetermined audio/text message, an audio/text message, subscriber profile information, subscriber identification information, phone numbers, an identification code of the communications device, video information, audio information, control information, information indicative sensor data (e.g., raw individual sensor information, combination of sensor information, processed sensor information, etc.), or a combination thereof. Depending upon the exact configuration and type of network entity 456, the memory portion 460 can include a computer storage medium, or media, that is volatile 464 (such as dynamic RAM), non-volatile 466 (such as ROM), or a combination thereof. The network entity 456 can include additional storage, in the form of computer storage media (e.g., removable storage 468 and/or non-removable storage 470) including, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory. As described herein, a computer storage medium is an article of manufacture.

The network entity 456 also can contain communications connection(s) 476 that allow the network entity 456 to communicate with other devices, network entities, or the like. A communications connection(s) can comprise communication media. Communication media can be used to communicate computer readable instructions, data structures, program modules, or other data. Communication media can include an appropriate transport mechanism or information delivery media that can be used to transport a modulated data signal such as a carrier wave.

The network entity 456 also can include input device(s) 472 such as keyboard, mouse, pen, voice input device, touch input device, an optical input device, etc. Output device(s) 474 such as a display, speakers, printer, mechanical vibrators, etc. also can be included.

The communications device (e.g., device 436) and the network entity (network entity 456) can be part of and/or in communication with various wireless communications networks. Some of which are described below.

Figure 11:
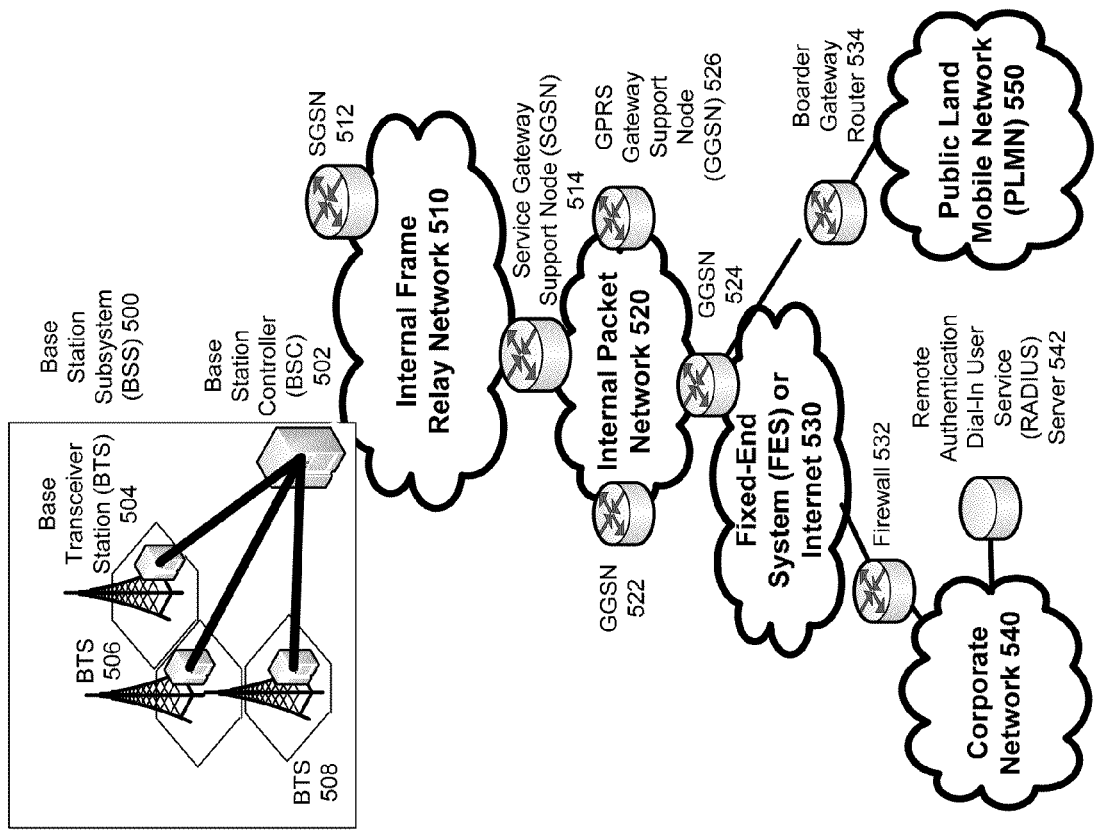
FIG. 11 depicts an overall block diagram of an example packet-based mobile cellular network environment, such as a GPRS network, in which visual voice mail systems can be implemented.

FIG. 11 depicts an overall block diagram of an example packet-based mobile cellular network environment, part of which is shown in FIG. 1 with respect to wireless device 14 and cellular station 16, such as a GPRS network, in which visual voice mail may be implemented. In the example packet-based mobile cellular network environment shown in FIG. 11, there are a plurality of Base Station Subsystems ("BSS") 500 (only one is shown), each of which comprises a Base Station Controller ("BSC") 502 serving a plurality of Base Transceiver Stations ("BTS") such as BTSs 504, 506, and 508. BTSs 504, 506, 508, etc. are the access points where users of packet-based mobile devices become connected to the wireless network. In example fashion, the packet traffic originating from user devices is transported via an over-the-air interface to a BTS 508, and from the BTS 508 to the BSC 502. Base station subsystems, such as BSS 500, are a part of internal frame relay network 510 that can include Service GPRS Support Nodes ("SGSN") such as SGSN 512 and 514. Each SGSN is connected to an internal packet network 520 through which a SGSN 512, 514, etc. can route data packets to and from a plurality of gateway GPRS support nodes (GGSN) 522, 524, 526, etc. As illustrated, SGSN 514 and GGSNs 522, 524, and 526 are part of internal packet network 520. Gateway GPRS serving nodes 522, 524 and 526 mainly provide an interface to external Internet Protocol ("IP") networks such as Public Land Mobile Network ("PLMN") 550, corporate intranets 540, or Fixed-End System ("FES") or the public Internet 530. As illustrated, subscriber corporate network 540 may be connected to GGSN 524 via firewall 532; and PLMN 550 is connected to GGSN 524 via boarder gateway router 534. The Remote Authentication Dial-In User Service ("RADIUS") server 542 may be used for caller authentication when a user of a mobile cellular device calls corporate network 540.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 12:
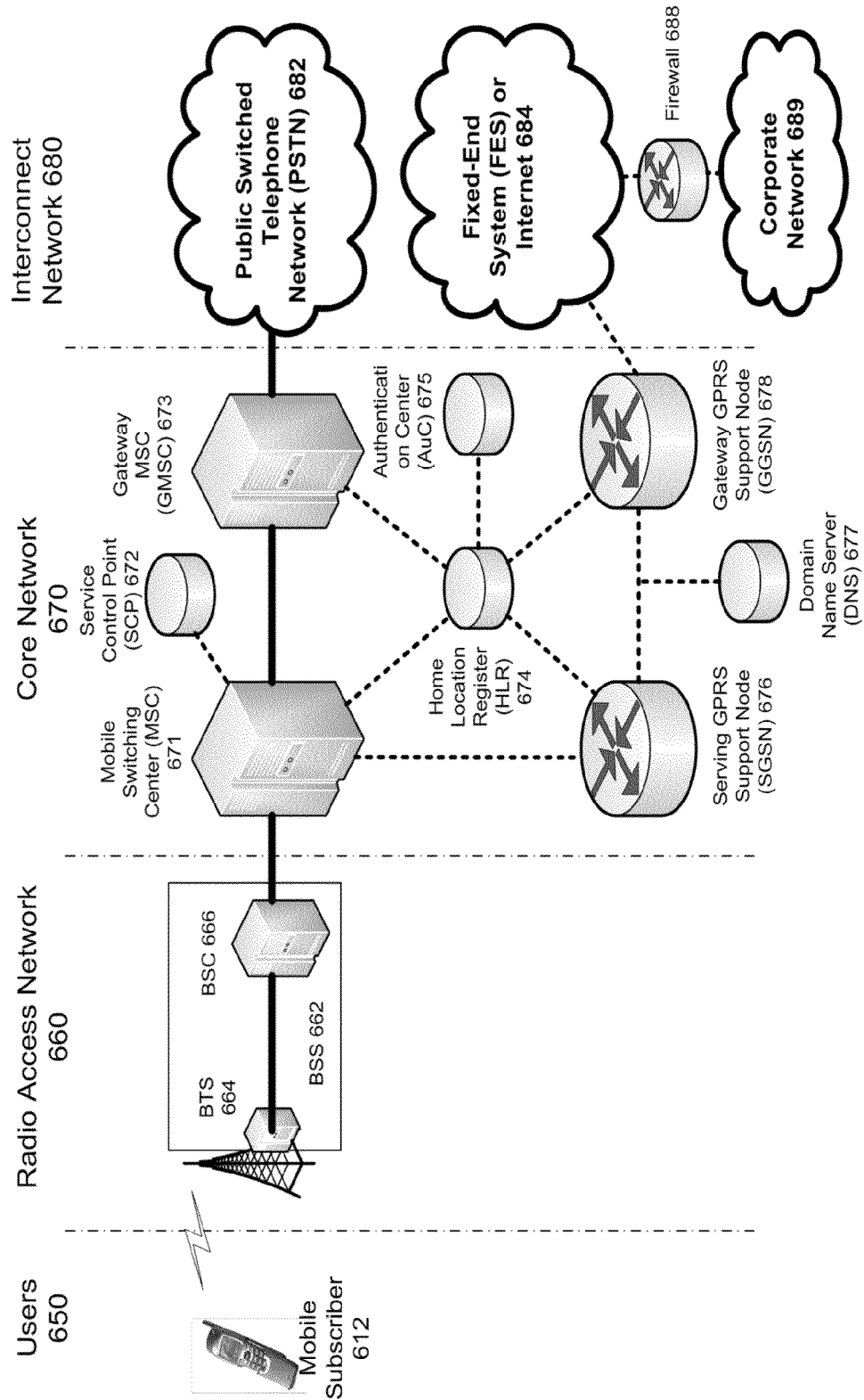
FIG. 12 illustrates an architecture of a typical GPRS network in which visual voice mail systems can be implemented.

FIG. 12 illustrates a more detailed architecture of a typical GPRS network in which visual voice mail may be implemented. The architecture depicted in FIG. 6 is segmented into four groups: users 650, radio access network 660, core network 670, and interconnect network 680. Users 650 comprise a plurality of end users. Note, device 612 is referred to as a mobile subscriber in the description of network shown in FIG. 6. In an example embodiment, the device depicted as mobile subscriber 612 comprises a communications device (e.g., wireless anti-theft security M2M type device 36). Radio access network 660 comprises a plurality of base station subsystems such as BSSs 662, which include BTSs 664 and BSCs 666. Core network 670 comprises a host of various network elements. As illustrated in FIG. 6, core network 670 may comprise Mobile Switching Center ("MSC") 671, Service Control Point ("SCP") 672, gateway MSC 673, SGSN 676, Home Location Register ("HLR") 674, Authentication Center ("AuC") 675, Domain Name Server ("DNS") 677, and GGSN 678. Interconnect network 680 also comprises a host of various networks and other network elements. As illustrated in FIG. 6, interconnect network 680 comprises Public Switched Telephone Network ("PSTN") 682, Fixed-End System ("FES") or Internet 684, firewall 688, and Corporate Network 689.

A mobile switching center can be connected to a large number of base station controllers. At MSC 671, for instance, depending on the type of traffic, the traffic may be separated in that voice may be sent to Public Switched Telephone Network ("PSTN") 682 through Gateway MSC ("GMSC") 673, and/or data may be sent to SGSN 676, which then sends the data traffic to GGSN 678 for further forwarding.

When MSC 671 receives call traffic, for example, from BSC 666, it sends a query to a database hosted by SCP 672. The SCP 672 processes the request and issues a response to MSC 671 so that it may continue call processing as appropriate.

The HLR 674 is a centralized database for users to register to the GPRS network. HLR 674 stores static information about the subscribers such as the International Mobile Subscriber Identity ("IMSI"), subscribed services, and a key for authenticating the subscriber. HLR 674 also stores dynamic subscriber information such as the current location of the mobile subscriber. Associated with HLR 674 is AuC 675. AuC 675 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 6, when mobile subscriber 612 initiates the attach process by turning on the network capabilities of the mobile device, an attach request is sent by mobile subscriber 612 to SGSN 676. The SGSN 676 queries another SGSN, to which mobile subscriber 612 was attached before, for the identity of mobile subscriber 612. Upon receiving the identity of mobile subscriber 612 from the other SGSN, SGSN 676 requests more information from mobile subscriber 612. This information is used to authenticate mobile subscriber 612 to SGSN 676 by HLR 674. Once verified, SGSN 676 sends a location update to HLR 674 indicating the change of location to a new SGSN, in this case SGSN 676. HLR 674 notifies the old SGSN, to which mobile subscriber 612 was attached before, to cancel the location process for mobile subscriber 612. HLR 674 then notifies SGSN 676 that the location update has been performed. At this time, SGSN 676 sends an Attach Accept message to mobile subscriber 612, which in turn sends an Attach Complete message to SGSN 676.

After attaching itself with the network, mobile subscriber 612 then goes through the authentication process. In the authentication process, SGSN 676 sends the authentication information to HLR 674, which sends information back to SGSN 676 based on the user profile that was part of the user's initial setup. The SGSN 676 then sends a request for authentication and ciphering to mobile subscriber 612. The mobile subscriber 612 uses an algorithm to send the user identification (ID) and password to SGSN 676. The SGSN 676 uses the same algorithm and compares the result. If a match occurs, SGSN 676 authenticates mobile subscriber 612.

Next, the mobile subscriber 612 establishes a user session with the destination network, corporate network 689, by going through a Packet Data Protocol ("PDP") activation process. Briefly, in the process, mobile subscriber 612 requests access to the Access Point Name ("APN"), for example, UPS.com, and SGSN 676 receives the activation request from mobile subscriber 612. SGSN 676 then initiates a Domain Name Service ("DNS") query to learn which GGSN node has access to the UPS.com APN. The DNS query is sent to the DNS server within the core network 670, such as DNS 677, which is provisioned to map to one or more GGSN nodes in the core network 670. Based on the APN, the mapped GGSN 678 can access the requested corporate network 689. The SGSN 676 then sends to GGSN 678 a Create Packet Data Protocol ("PDP") Context Request message that contains necessary information. The GGSN 678 sends a Create PDP Context Response message to SGSN 676, which then sends an Activate PDP Context Accept message to mobile subscriber 612.

Once activated, data packets of the call made by mobile subscriber 612 can then go through radio access network 660, core network 670, and interconnect network 680, in a particular fixed-end system or Internet 684 and firewall 688, to reach corporate network 689.

Figure 13:
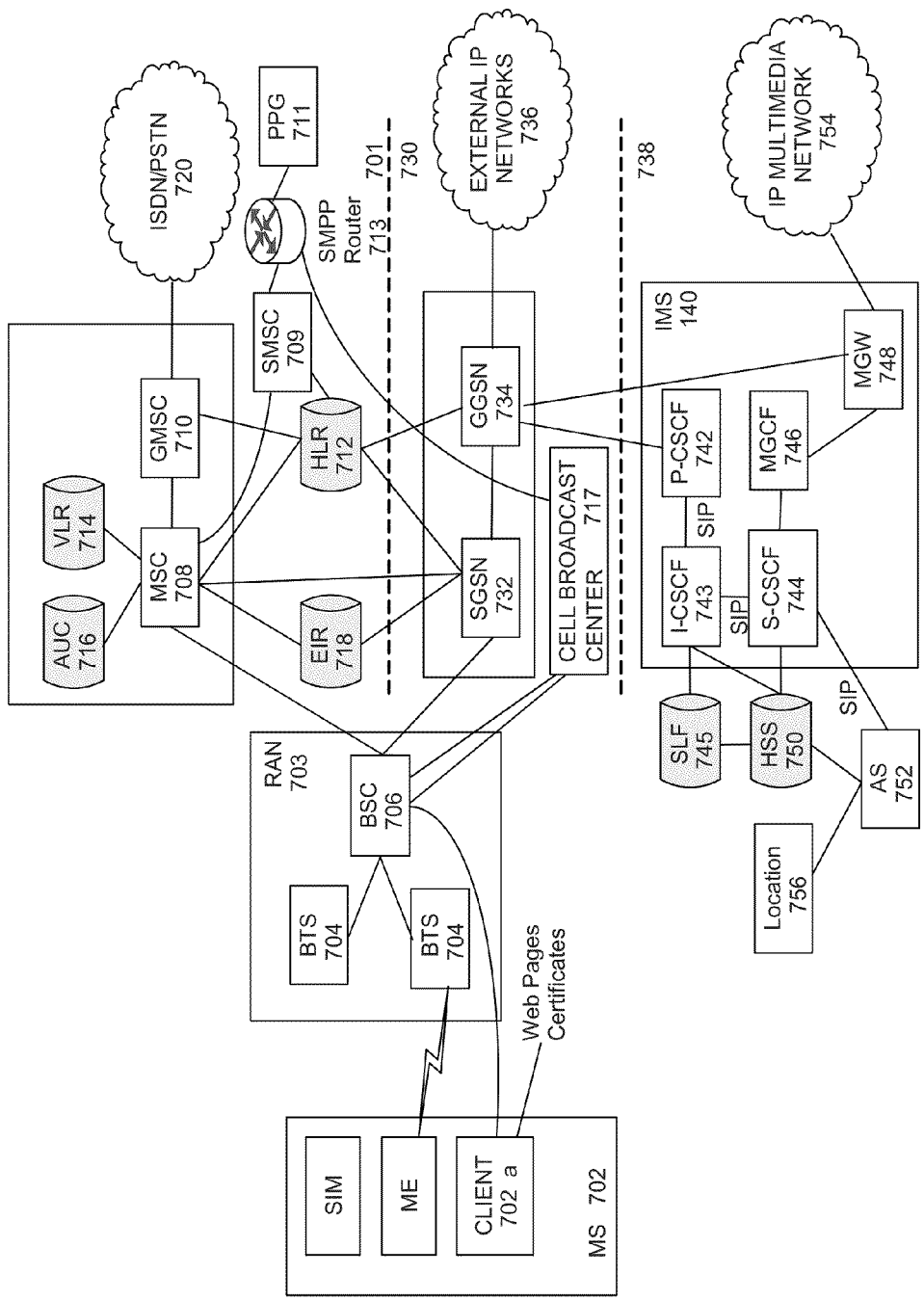
FIG. 13 illustrates an example block diagram view of a GSM/GPRS/IP multimedia network architecture within which visual voice mail systems can be implemented.

FIG. 13 illustrates an example block diagram view of a GSM/GPRS/IP multimedia network architecture within which visual voice mail systems can be implemented. As illustrated, the architecture of FIG. 13 includes a GSM core network 701, a GPRS network 730 and an IP multimedia network 738. The GSM core network 701 includes a Mobile Station (MS) 702, at least one Base Transceiver Station (BTS) 704 and a Base Station Controller (BSC) 706. The MS 702 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 704 is physical equipment, such as a radio tower, that enables a radio interface to communicate with the MS. Each BTS may serve more than one MS. The BSC 706 manages radio resources, including the BTS. The BSC may be connected to several BTSs. The BSC and BTS components, in combination, are generally referred to as a base station (BSS) or radio access network (RAN) 703.

The GSM core network 701 also includes a Mobile Switching Center (MSC) 708, a Gateway Mobile Switching Center (GMSC) 710, a Home Location Register (HLR) 712, Visitor Location Register (VLR) 714, an Authentication Center (AuC) 718, and an Equipment Identity Register (EIR) 716. The MSC 708 performs a switching function for the network. The MSC also performs other functions, such as registration, authentication, location updating, handovers, and call routing. The GMSC 710 provides a gateway between the GSM network and other networks, such as an Integrated Services Digital Network (ISDN) or Public Switched Telephone Networks (PSTNs) 720. Thus, the GMSC 710 provides interworking functionality with external networks.

The HLR 712 is a database that contains administrative information regarding each subscriber registered in a corresponding GSM network. The HLR 712 also contains the current location of each MS. The VLR 714 is a database that contains selected administrative information from the HLR 712. The VLR contains information necessary for call control and provision of subscribed services for each MS currently located in a geographical area controlled by the VLR. The HLR 712 and the VLR 714, together with the MSC 708, provide the call routing and roaming capabilities of GSM. The AuC 716 provides the parameters needed for authentication and encryption functions. Such parameters allow verification of a subscriber's identity. The EIR 718 stores security-sensitive information about the mobile equipment.

A Short Message Service Center (SMSC) 709 allows one-to-one Short Message Service (SMS) messages to be sent to/from the MS 702. A Push Proxy Gateway (PPG) 711 is used to "push" (i.e., send without a synchronous request) content to the MS 702. The PPG 711 acts as a proxy between wired and wireless networks to facilitate pushing of data to the MS 702. A Short Message Peer to Peer (SMPP) protocol router 713 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 702 sends a location update including its current location information to the MSC/VLR, via the BTS 704 and the BSC 706. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 730 is logically implemented on the GSM core network architecture by introducing two packet-switching network nodes, a serving GPRS support node (SGSN) 732, a cell broadcast and a Gateway GPRS support node (GGSN) 734. The SGSN 732 is at the same hierarchical level as the MSC 708 in the GSM network. The SGSN controls the connection between the GPRS network and the MS 702. The SGSN also keeps track of individual MS's locations and security functions and access controls.

A Cell Broadcast Center (CBC) 717 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 734 provides a gateway between the GPRS network and a public packet network (PDN) or other IP networks 736. That is, the GGSN provides interworking functionality with external networks, and sets up a logical link to the MS through the SGSN. When packet-switched data leaves the GPRS network, it is transferred to an external TCP-IP network 736, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 730 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 738 was introduced with 3GPP Release 7, and includes an IP multimedia subsystem (IMS) 740 to provide rich multimedia services to end users. A representative set of the network entities within the IMS 740 are a call/session control function (CSCF), a media gateway control function (MGCF) 746, a media gateway (MGW) 748, and a master subscriber database, called a home subscriber server (HSS) 750. The HSS 750 may be common to the GSM network 701, the GPRS network 730 as well as the IP multimedia network 738.

The IP multimedia system 740 is built around the call/session control function, of which there are three types: an interrogating CSCF (I-CSCF) 743, a proxy CSCF (P-CSCF) 742, and a serving CSCF (S-CSCF) 744. The P-CSCF 742 is the MS's first point of contact with the IMS 740. The P-CSCF 742 forwards session initiation protocol (SIP) messages received from the MS to an SIP server in a home network (and vice versa) of the MS. The P-CSCF 742 may also modify an outgoing request according to a set of rules defined by the network operator (for example, address analysis and potential modification).

The I-CSCF 743, forms an entrance to a home network and hides the inner topology of the home network from other networks and provides flexibility for selecting an S-CSCF. The I-CSCF 743 may contact a subscriber location function (SLF) 745 to determine which HSS 750 to use for the particular subscriber, if multiple HSS's 750 are present. The S-CSCF 744 performs the session control services for the MS 702. This includes routing originating sessions to external networks and routing terminating sessions to visited networks. The S-CSCF 744 also decides whether an application server (AS) 752 is required to receive information on an incoming SIP session request to ensure appropriate service handling. This decision is based on information received from the HSS 750 (or other sources, such as an application server 752). The AS 752 also communicates to a location server 756 (e.g., a Gateway Mobile Location Center (GMLC)) that provides a position (e.g., latitude/longitude coordinates) of the MS 702.

The HSS 750 contains a subscriber profile and keeps track of which core network node is currently handling the subscriber. It also supports subscriber authentication and authorization functions (AAA). In networks with more than one HSS 750, a subscriber location function provides information on the HSS 750 that contains the profile of a given subscriber.

The MGCF 746 provides interworking functionality between SIP session control signaling from the IMS 740 and ISUP/BICC call control signaling from the external GSTN networks (not shown). It also controls the media gateway (MGW) 748 that provides user-plane interworking functionality (e.g., converting between AMR- and PCM-coded voice). The MGW 748 also communicates with other IP multimedia networks 754.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

FIG. 14 illustrates a public land mobile network (PLMN) block diagram view of an example architecture in which visual voice mail systems may be incorporated. Mobile Station (MS) 801 is the physical equipment used by the PLMN subscriber. In one example embodiment, communications device 436 may serve as Mobile Station 801. Mobile Station 801 may be one of, but not limited to, a cellular telephone, a cellular telephone in combination with another electronic device or any other wireless mobile communication device.

Mobile Station 801 may communicate wirelessly with Base Station System (BSS) 810. BSS 810 contains a Base Station Controller (BSC) 811 and a Base Transceiver Station (BTS) 812. BSS 810 may include a single BSC 811/BTS 812 pair (Base Station) or a system of BSC/BTS pairs which are part of a larger network. BSS 810 is responsible for communicating with Mobile Station 801 and may support one or more cells. BSS 810 is responsible for handling cellular traffic and signaling between Mobile Station 801 and Core Network 840. Typically, BSS 810 performs functions that include, but are not limited to, digital conversion of speech channels, allocation of channels to mobile devices, paging, and transmission/reception of cellular signals.

Additionally, Mobile Station 801 may communicate wirelessly with Radio Network System (RNS) 820. RNS 820 contains a Radio Network Controller (RNC) 821 and one or more Node(s) B 822. RNS 820 may support one or more cells. RNS 820 may also include one or more RNC 821/Node B 822 pairs or alternatively a single RNC 821 may manage multiple Nodes B 822. RNS 820 is responsible for communicating with Mobile Station 801 in its geographically defined area. RNC 821 is responsible for controlling the Node(s) B 822 that are connected to it and is a control element in a UMTS radio access network. RNC 821 performs functions such as, but not limited to, load control, packet scheduling, handover control, security functions, as well as controlling Mobile Station 801's access to the Core Network (CN) 840.

The evolved UMTS Terrestrial Radio Access Network (E-UTRAN) 830 is a radio access network that provides wireless data communications for Mobile Station 801 and User Equipment 802. E-UTRAN 830 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 830 may include of series of logical network components such as E-UTRAN Node B (eNB) 831 and E-UTRAN Node B (eNB) 832. E-UTRAN 830 may contain one or more eNBs. User Equipment 802 may be any user device capable of connecting to E-UTRAN 830 including, but not limited to, a personal computer, laptop, mobile device, wireless router, or other device capable of wireless connectivity to E-UTRAN 830. The improved performance of the E-UTRAN 830 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 14 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 801 may communicate with any or all of BSS 810, RNS 820, or E-UTRAN 830. In an example system, each of BSS 810, RNS 820, and E-UTRAN 830 may provide Mobile Station 801 with access to Core Network 840. The Core Network 840 may include of a series of devices that route data and communications between end users. Core Network 840 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 841 is part of Core Network 840, and interacts with Visitor Location Register (VLR) and Mobile-Services Switching Center (MSC) Server 860 and Gateway MSC Server 861 in order to facilitate Core Network 840 resource control in the CS domain. Functions of CS-MGW 841 include, but are not limited to, media conversion, bearer control, payload processing and other mobile network processing such as handover or anchoring. CS-MGW 840 may receive connections to Mobile Station 801 through BSS 810, RNS 820 or both.

Serving GPRS Support Node (SGSN) 842 stores subscriber data regarding Mobile Station 801 in order to facilitate network functionality. SGSN 842 may store subscription information such as, but not limited to, the International Mobile Subscriber Identity (IMSI), temporary identities, or Packet Data Protocol (PDP) addresses. SGSN 842 may also store location information such as, but not limited to, the Gateway GPRS Support Node (GGSN) 844 address for each GGSN where an active PDP exists. GGSN 844 may implement a location register function to store subscriber data it receives from SGSN 842 such as subscription or location information.

Serving Gateway (S-GW) 843 is an interface which provides connectivity between E-UTRAN 830 and Core Network 840. Functions of S-GW 843 include, but are not limited to, packet routing, packet forwarding, transport level packet processing, event reporting to Policy and Charging Rules Function (PCRF) 850, and mobility anchoring for inter-network mobility. PCRF 850 uses information gathered from S-GW 843, as well as other sources, to make applicable policy and charging decisions related to data flows, network resources and other network administration functions. Packet Data Network Gateway (PDN-GW) 845 may provide user-to-services connectivity functionality including, but not limited to, network-wide mobility anchoring, bearer session anchoring and control, and IP address allocation for PS domain connections.

Home Subscriber Server (HSS) 863 is a database for user information, and stores subscription data regarding Mobile Station 801 or User Equipment 802 for handling calls or data sessions. Networks may contain one HSS 863 or more if additional resources are required. Example data stored by HSS 863 include, but is not limited to, user identification, numbering and addressing information, security information, or location information. HSS 863 may also provide call or session establishment procedures in both the PS and CS domains.

The VLR/MSC Server 860 provides user location functionality. When Mobile Station 801 enters a new network location, it begins a registration procedure. A MSC Server for that location transfers the location information to the VLR for the area. A VLR and MSC Server may be located in the same computing environment, as is shown by VLR/MSC Server 860, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 801 registration or procedures for handover of Mobile Station 801 to a different section of the Core Network 840. GMSC Server 861 may serve as a connection to alternate GMSC Servers for other mobile stations in larger networks.

Equipment Identity Register (EIR) 862 is a logical element which may store the International Mobile Equipment Identities (IMEI) for Mobile Station 801. In a typical embodiment, user equipment may be classified as either "white listed" or "black listed" depending on its status in the network. In one embodiment, if Mobile Station 801 is stolen and put to use by an unauthorized user, it may be registered as "black listed" in EIR 862, preventing its use on the network. Mobility Management Entity (MME) 864 is a control node which may track Mobile Station 801 or User Equipment 802 if the devices are idle. Additional functionality may include the ability of MME 864 to contact an idle Mobile Station 801 or User Equipment 802 if retransmission of a previous session is required.

While example embodiments of visual voice mail systems in a multi-screen environment time have been described in connection with various computing devices/processors, the underlying concepts can be applied to any computing device, processor, or system capable of receiving visual voice mail notifications as described herein. The methods and apparatuses for multi-screen visual voice mail applications, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for distributing connectivity and/or transmission time. A computer-readable storage medium, as described herein is an article of manufacture, and thus, not to be construed as a transitory signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for multi-screen visual voice mail systems can be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for processing visual voice mail messages in a multi-screen environment. When implemented on a general-purpose processor, the program code combines with the processor to provide a unique apparatus that operates to invoke the functionality of distributing connectivity and/or transmission time.

While multi-screen visual voice mail systems have been described in connection with the various embodiments of the various figures, it is to be understood that other similar embodiments can be used or modifications and additions can be made to the described embodiments for distributing connectivity and/or transmission time. For example, one skilled in the art will recognize that multi-screen visual voice mail systems as described in the present application may apply to any environment, whether wired or wireless, and may be applied to any number of devices connected via a communications network and interacting across the network. Therefore, systems and methods for multi-screen visual voice mail should not be limited to any single embodiment, but rather should be construed in breadth and scope in accordance with the appended claims.

What is claimed:

1. A method comprising:
    identifying a recipient of a voice mail message;
    receiving a notification indicative of at least one of;
        an availability of the recipient; or
        a presence of the recipient;
    receiving the voice mail message;
    selectively converting the voice mail message to a text message based on the notification; and
    providing a map to a device of the recipient based on the notification, wherein:
        one of the voice mail message or the text message is retrievable by selecting, on the map, a location associated with the voice mail message.

2. The method of claim 1, wherein the map is delivered to a device of the recipient using a packet switched network.

3. The method of claim 1, further comprising delivering the map to an alternative destination device using internet protocol.

4. The method of claim 3, wherein the alternative destination device comprises an appliance connected to the internet.

5. The method of claim 1, further comprising providing the map to designated devices of each of multiple recipients based on a distribution list.

6. The method of claim 5, wherein:
    at least one recipient of the multiple recipients receives the map wherein the voice mail message is retrievable by selecting the location; and
    another recipient of the multiple recipients receives the map wherein the text message is retrievable by selecting the location.

7. A method comprising:
    receiving a text message at a voice mail server representative of the voice mail message to be delivered to a recipient;
    converting the text message to the voice mail message; and
    providing, based on at least one of availability of the recipient, presence of the recipient, location of the recipient, or selection of an alternative destination device of the recipient, a map to a device of the recipient via a packet switched network, wherein the voice mail message is retrievable by selecting, on the map, a location associated with the voice mail message.

8. The method of claim 7, wherein the voice mail message is provided via a circuit switched network if the packet switched network is unavailable.

9. The method of claim 7, further comprising providing the map to multiple recipients based on a distribution list.

10. The method of claim 7, wherein the location comprises a destination of interest.

11. The method of claim 7 wherein the text mail message is selectively transcribed to a voice mail message based on a location of the recipient.

12. A voice mail server comprising:
    a processor; and memory coupled to the processor, the memory comprising executable instructions that when executed by the processor cause the processor to effectuate operations comprising:

receiving a voice mail message from a calling party to a recipient;

selectively transcribing the voice mail message to a text message based on at least one of availability of the recipient, the presence of the recipient, location of the recipient, or a selected destination receiving device of the recipient; and providing a map to the recipient, wherein, based on the transcribing, one of the voice mail message or the text message is retrievable by selecting, on the map, a location associated with the voice mail message.

13. The voice mail server of claim 12, the operations further comprising providing the map to multiple recipients in the distribution list.

14. The voice mail server of claim 12, wherein the location comprises a location of interest.

15. A visual voice mail server comprising:

a processor; and memory coupled to the processor, the memory comprising executable instructions that when executed by the processor cause the processor to effectuate operations comprising:

transcribing a voice mail message to a text message;

providing a map to an intended recipient of a distribution list comprising a plurality of intended recipients, wherein the text message is retrievable by selecting, on the map, a location associated with the voice mail message; and providing, based on at least one of availability of the recipient, presence of the recipient, location of the recipient, or selection of an alternative destination device of the recipient, the map to another intended recipient of the distribution list, wherein the voice mail message is retrievable by selecting the location on the map.

16. The visual voice mail server of claim 15, the operations further comprising providing one of the voice mail message or the text message based on a location of each of the intended recipients.

17. The visual voice mail server of claim 15, wherein the location comprises a destination of interest.

\* \* \* \* \*